(12) United States Patent
Dickinson et al.

(10) Patent No.: US 6,444,599 B1
(45) Date of Patent: *Sep. 3, 2002

(54) RARE EARTH ELEMENT-HALIDE ENVIRONMENTS IN OXYHALIDE GLASSES

(75) Inventors: James E. Dickinson; Adam J. G. Ellison, both of Corning, NY (US)

(73) Assignee: Corning Incorporation, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/555,727

(22) PCT Filed: Nov. 16, 1998

(86) PCT No.: PCT/US98/24386

§ 371 (c)(1),
(2), (4) Date: Jun. 1, 2000

Related U.S. Application Data

(60) Provisional application No. 60/067,245, filed on Dec. 2, 1997.

(51) Int. Cl.[7] ............... C03C 3/068; C03C 3/095; C03C 3/15
(52) U.S. Cl. ............... 501/43; 501/50; 501/52; 501/56; 501/59; 501/77; 501/78
(58) Field of Search ............... 501/43, 50, 52, 501/56, 59, 77, 78

(56) References Cited

U.S. PATENT DOCUMENTS

| | | | |
|---|---|---|---|
| 4,562,161 A | | 12/1985 | Mennemann et al. |
| 4,792,535 A | * | 12/1988 | Fine ............... 501/66 |
| 4,868,141 A | | 9/1989 | Fine |
| 5,324,691 A | | 6/1994 | Tarumi et al. |
| 5,545,595 A | * | 8/1996 | Wang et al. ............... 501/3 |
| 5,610,108 A | | 3/1997 | Watzke et al. |
| 5,798,306 A | | 8/1998 | Dickinson, Jr. |
| 5,955,388 A | * | 9/1999 | Dejenka ............... 501/3 |
| 6,281,151 B1 | * | 8/2001 | Tick ............... 501/3 |

* cited by examiner

*Primary Examiner*—Karl Group
(74) *Attorney, Agent, or Firm*—Mary Y. Redman

(57) ABSTRACT

The present invention relates to an oxyhalide glass matrix including 0–70 mol. % $SiO_2$, 5–35 mol. % $Al_2O_3$, 1–50 mol. % $B_2O_3$, 5–35 mol. % $R_2O$, 0–12 wt. % F, 0–12 wt. % Cl, and 0 to 0.2 mol. % rare earth element, wherein R is Li, Na, K, Rb, or Cs. The present invention further relates to a method of producing the glass matrix and to a method of modifying the spectral properties of an oxyhalide glass.

9 Claims, 2 Drawing Sheets

— Silica (oxide host)
--- ZBLAN (flouride host)
-·-·- 172GQK (oxyfluoride host)

RARE EARTH ELEMENT-HALIDE ENVIRONMENTS IN OXYHALIDE GLASSES

This application claims benefit of provisional application No. 60/067,245, filed Dec. 2, 1997.

FIELD OF THE INVENTION

The present invention relates to oxyhalide glasses and a method of making the oxyhalide glasses, as well as to a method of modifying the spectral properties of the oxyhalide glass.

BACKGROUND OF THE INVENTION

Recently, transparent materials capable of efficient frequency upconversion, most being various rare-earth ion-doped fluoride glasses and crystals, have received great attention due to the possibilities of utilizing these materials to achieve blue or green solid state lasers. While no significant difference in upconversion efficiency is observed between fluoride glasses and single crystals, single mode optical fiber doped with a low level of rare-earth ions can be drawn from fluoride glasses, bringing about highly efficient blue or green upconversion fiber lasers. Unfortunately, heavy metal fluoride glasses suffer certain undesirable attributes which have restricted their applications. Most notably, heavy metal fluoride glasses exhibit poor resistance to devitrification. U.S. Pat. No. 4,674,835 to Mimura et al. discusses the crystallization problems of heavy metal fluoride glasses, one example of which is termed ZBLAN, and the light scattering problems resulting therefrom.

The great susceptibility of heavy metal fluoride glasses to devitrification also generates problems in forming large preforms. Crystallization at the interface between the core and cladding during the production of the preform causes problems in the most commonly used methods for preparing an optical fiber. That is, heavy metal fluoride glasses are quite prone to inhomogeneous nucleation, the consequence of which being crystallization at the core and cladding interfaces, particularly during the drawing of the optical fiber. The resulting fibers are subject to serious scattering losses due to crystals in the fibers.

Devitrification of the heavy metal fluoride glasses is aggravated when ions necessary to impart differences in indices of refraction to the core and cladding are added to the glass composition. Additional doping, for example, with rare earth metal ions, also tends to reduce the stability of the glass. As a consequence of those problems, research has focused on finding additives to the base fluoride glass composition which will reduce the tendency of the glass to devitrify and to increase the chemical stability thereof. In addition, the preparation of fluoride glasses requires the glass forming components to be reheated at high temperatures. In addition, fluoride glasses cannot be melted in air, but require water-free, inert gas environment.

Most oxide glasses (such as silica oxide) are much more chemically and mechanically stable and are easier to prepare and more easily fabricated into rods, optical fibers, or planar waveguides than fluoride glasses. Unfortunately, due to their larger phonon energy, silica glasses are very inefficient for infrared upconversion. It has also been shown that addition of oxides into fluoride glasses to improve their stability is not preferred since even a small addition of oxides will significantly quench the upconversion luminescence.

Early in 1975, Auzel et al., *J. Electrochem. Soc.,* 122:101 (1975) reported an interesting class of infrared ("IR") upconversion materials which were prepared from classical glass-forming oxides ($SiO_2$, $GeO_2$, $P_2O_6$, etc. with $PbF_2$ and rare-earth oxides), and showed an efficiency nearly twice as high as $LaF_3$:Yb:Er phosphor. Since these kinds of materials were comprised of inhomogeneous glassy and crystalline phases and the embedded crystals were very large in size (around 10:m), they were not transparent.

Wang et al., "New Transparent Vitroceramics Codoped With $Er^{3+}$ and $Yb^{3+}$ For Efficient Frequency Upconversion," *Appl. Phys. Lett.,* 63(24):3268–70 (1993) describes transparent oxyfluoride vitroceramics (also called glass ceramics) containing oxides of large phonon energy like $SiO_2$ and $AlO_{1.5}$ but showing IR to visible upconversion which was more efficient than fluoride glass. The composition of Wang consisted essentially, expressed in terms of mole percent, of

| $SiO_2$ | 30 | $CdF_2$ | 20 |
| $AlO_{1.5}$ | 15 | $YbF_3$ | 10 |
| $PbF_2$ | 24 | $ErF_3$ | 1 |

The glass produced from that composition was heat treated at 470EC to develop microcrystallites which the authors stated did not reduce the transparency of the body.

The authors posited that the $Yb^{3+}$ and $Er^{3+}$ ions were preferentially segregated from the precursor glass and dissolved into the microcrystals upon heat treatment. The size of the microcrystallites was estimated by the authors to range from about 20 nm; that size being so small that light scattering loss was minimal. The authors reported the upconversion efficiency of their products to be about 2 to 10 times as high as that measured on the precursor glass and other fluoride-containing glasses. However, the crystals which are formed in the Wang glass have a cubic lattice structure, which limits the concentration of some of the trivalent rare-earth elements which can be incorporated into the glass ceramic. Another problem with these materials is that they require cadmium in the formulation. Cadmium is a carcinogen and, thus, its use is restricted. Further, the glass-ceramic in Wang does not appear to have a broad flat emission spectra required for some amplifier applications.

The present invention is directed toward overcoming these above-noted deficiencies.

SUMMARY OF THE INVENTION

The present invention relates to an oxyhalide glass matrix which includes 0–70 mol. % $SiO_2$, 5–35 mol. % $Al_2O_3$, 1–50 mol. % $B_2O_3$, 5–35 mol. % $R_2O$, 0–12 wt. % F, 0–12 wt. % Cl, and 0 to 0.2 mol. % rare earth element, where R is Li, Na, K, Rb, or Cs.

Another aspect of the present invention relates to a method of making the glass matrix. The method includes providing glass forming components and treating the glass forming components under conditions effective to produce the glass matrix.

Yet another aspect of the present invention relates to a method of modifying the spectral properties of an oxyhalide glass. The method includes altering the halide content of the oxyhalide glass where the spectral properties of the oxyhalide glass are modified.

The glass matrix of the present invention is highly desirable in applications where there is a requirement for the glass to be fabricated in air using standard melting techniques and batch reagents. In addition, the glasses of the present invention are more environmentally stable than fluoride or chloride glasses, and therefore, are more suitable in real-world applications. Further, the glass matrix of the present invention allows rare earth elements to be loaded into the matrix at high concentrations. Further, the glass matrix of the present invention has a broad flat gain spectrum, allowing it to be tailored for specific amplifier applications.

DETAILED DESCRIPTION OF THE INVENTION

Figure 1:
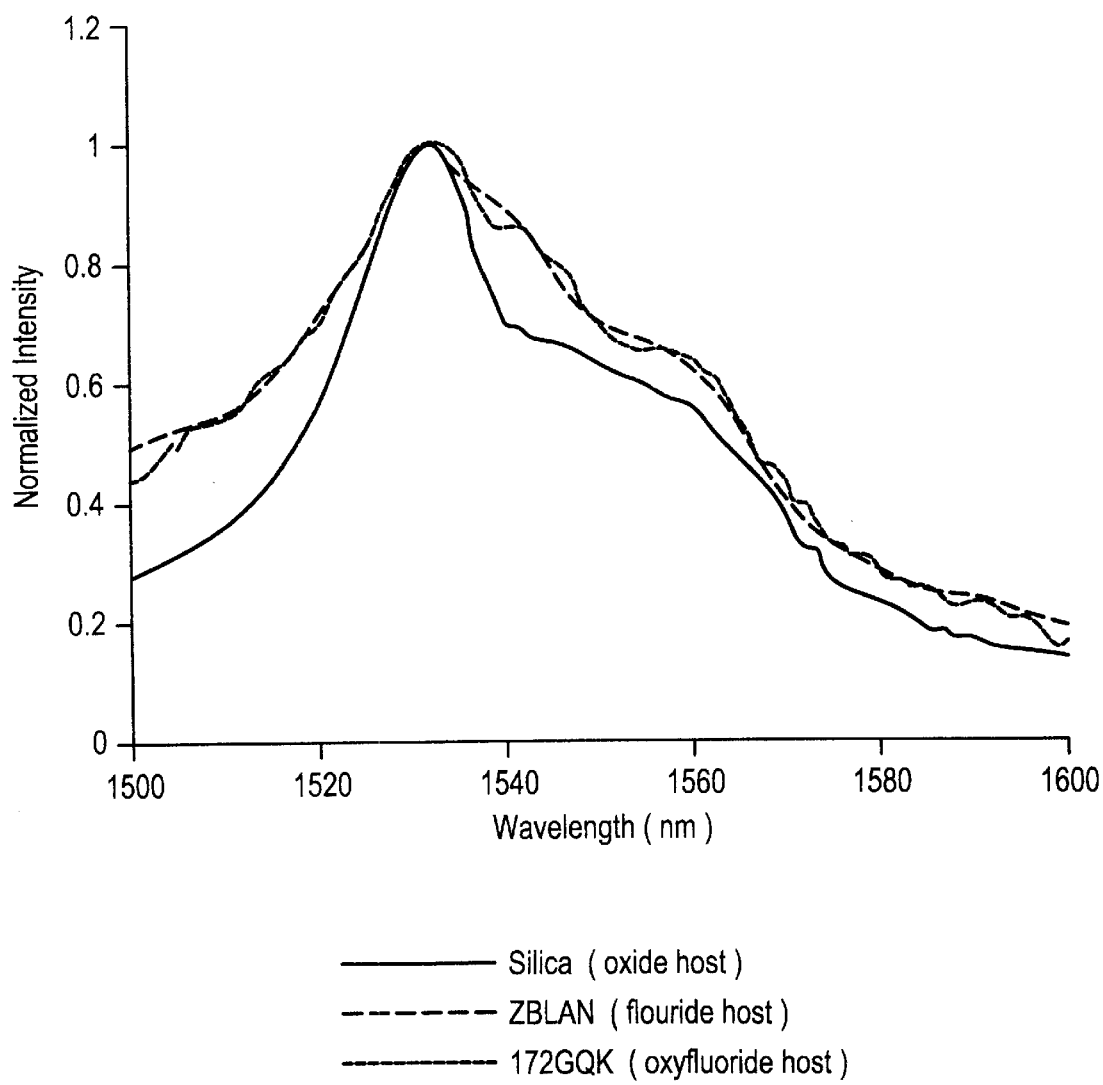
FIG. 1 is a graph comparing the emission spectra of $Er^{3+}$ in an oxide glass, $Er^{3+}$ in a pure fluoride glass, and $Er^{3+}$ in a potassium boroaluminofluorosilicate glass.

The present invention relates to an oxyhalide glass matrix which includes 0–70 mol. % $SiO_2$, 5–35 mol. % $Al_2O_3$, 1–50 mol. % $B_2O_3$, 5–35 mol. % $R_2O$, 0–12 wt. % F, 0–12 wt. % Cl, and 0 to 0.2 mol. % rare earth element, where R is Li, Na, K, Rb, or Cs.

The local bonding environments of rare earth elements ("REEs") in glasses determine the characteristics of their emission and absorption spectra. A number of factors influence the width, shape, and absolute energy of emission and absorption bands, including the identity of the anion(s) and next-nearest-neighbor cations, the symmetry of any particular site, the total range of site compositions and symmetries throughout the bulk sample, and the extent to which emission at a particular wavelength is coupled to phonon modes within the sample. Fluoride and chloride glasses are useful hosts for optically active REE, because the fluorine or chlorine atoms surrounding the REEs substantially impact REE emission and absorption spectra. The extreme electronegativity of fluorine or chlorine lifts the degeneracy of the electronic states of the REE, producing emission and absorption bands which differ substantially from those produced in oxide hosts: they are broader, and have different relative intensities and, sometimes, different positions. They are also often blue-shifted relative to their positions in oxide glasses. In general, the absolute position and width of an emission or absorption band shifts to lower energy as the electronegativity of the surrounding anions decreases: for example, the total bandwidth of the $Er^{3+}$ 1530 nm emission band in fluoride glasses, such as ZBLAN, is greater than in nearly any oxide glass, and the high-energy edge of the emission band in a fluoride glass is at a higher energy than in an oxide glass. In certain systems, such as hybrid oxyfluoride glasses, it is possible to obtain much of the bandwidth and gain flatness of a fluoride glass by creating environments for the REE that are a combination of oxide and fluoride-like sites.

For optical amplifier applications, the region over which a convolution of the emission and absorption is the flattest is the optimal window through which to pass signals. Because both the position of the overall emission bands and the structure within the band vary from fluoride to oxide to chloride hosts, the window with optimal gain flatness also varies. Ideally one would like to obtain the broadest emission possible in a single glass. Given the trends discussed above, the best possible glass would combine fluoride+oxide, fluoride+chloride, or fluoride+oxide+chloride environments to produce a single broad emission band. Indeed, with chloride environments involved, then it might be possible to use the same glass for both 1.3:m and 1.5:m amplifier applications.

Relative to oxide glasses, fluoride or chloride glasses also can accommodate very high concentrations of REEs without incurring nonradiative losses, due to energy transfers between the REE. On the other hand, fluoride and chloride glasses must be prepared under controlled atmospheres, have extremely high coefficients of thermal expansion, and are environmentally unstable compared to many oxide glasses, which complicates their use in real-world applications. Ideally, one would like glasses that produce the fluoride-like environments for REEs while retaining the physical and chemical characteristics of oxide glasses.

Accordingly, the present invention is directed to a broad range of aluminosilicate oxide glasses in which halides, such as fluorine and chlorine, and REEs can be added in high concentrations. These glasses produce halide-like environments for the REE. When fluorine alone as the halide is added, this results in the spectral properties typical of pure fluoride glasses, including broad emission spectra, improved emission lifetimes, and relative band intensities like fluorides rather than oxides. Likewise, when chlorine alone is added, this results in an oxychloride glass having the spectral properties of pure chloride glasses. When a mixture of fluorine and chlorine is used, glasses can be tailored to have desirable spectral properties for individual applications. In particular, glasses having a broad, flat emission spectra can be produced. A flat emission spectra is defined as those spectra with less than 10% gain ripple over bands (or windows) up to 35 nm wide. Further, addition of fluorine, chlorine, or mixtures thereof results in improved dispersal of the REE throughout the glass, which facilitates higher REE loadings without degradation of lifetime. Although not meaning to be bound by theory, it is believed that higher concentrations of REEs are possible, because they are dispersed in separate locations and, accordingly, cannot physically interact with each other.

The present invention relates to a glass matrix. Specifically, the invention relates to a broad class of aluminosilicate oxide glasses in which a halide and a rare earth element ("REE") can be added. Preferable halides include fluorine and chlorine. Preferable REEs include Y, La, Ce, Pr, Nd, Pm, Sm, Eu, Gd, Tb, Dy, Ho, Er, Tm, Yb, and Lu.

Preferably, the glass matrix is a $R_2O$—$Al_2O_3$—$B_2O_3$—$SiO_2$—F—Cl composition, where R is Li, Na, K, Rb, or Cs, and where the glass matrix is doped with one or more REEs. More preferably, the glass matrix includes 0–70 mol. % $SiO_2$, 5–35 mol. % $Al_2O_3$, 1–50 mol. % $B_2O_3$, 5–35 mol. % $R_2O$, 0–12 wt. % F, 0–12 wt. % Cl, and 0 to 0.2 mol. % REE, with from 25–60 mol. % $SiO_2$, 10–25 mol. % $Al_2O_3$, 3–35 mol. % $B_2O_3$, 10–25 mol. % $R_2O$, 0–10 wt. % F, and 0–12 wt. % Cl being especially preferred. Generally, the halide is present in the form of alkali/alkaline earth or aluminum halide. Preferably, the fluorine is expressed as $Al_2F_6$ and the chlorine is expressed as $Al_2Cl_6$, where the fluorine is expressed as up to 14 mol. % $Al_2F_6$ and the chlorine is expressed as up to 7 mol. % $Al_2Cl_6$.

The glass matrix of the present invention includes at least two distinct locations. In the first location, the halides are present. In the second location, the oxides are present. The REE may be present in either of the two locations. Alternatively, the halides are present in separate locations and the oxides are present in a separate location and the REEs are present in any or all of these separate locations. As discussed above, because the halides and oxides are present in separate locations, and the REEs are dispersed in these separate locations, they are not physically able to interact with each other. Thus, higher loadings of REEs are possible. Accordingly, smaller amplifiers are possible when made out of the glass matrix of the present invention, because less waveguide material for the same amount of gain is needed.

If no boron is included in the oxyhalide glass formulation, the spectra properties of the oxyhalide glass resemble those of the best oxide glasses, but REEs can be loaded at much higher concentrations before nonradiative losses cause lifetime reductions.

As increasing amounts of boron are added to a fluorine-bearing glass, the spectra begins to approach those of pure fluoride glasses, and when the fluorine/boron molar ratio is 1:1 or greater, spectra essentially identical to those of pure fluoride glasses (such as ZBLAN) are obtained. In particular, oxyhalide glasses having from 5 to 12 wt. % fluorine have emission spectral properties from 1450 to 1650 nm which are essentially identical to those of a pure fluoride glass. Further, oxyhalide glasses having from 5 to 12 wt. % fluorine have absorption spectral properties from 1450 to 1650 nm which are essentially identical to those of a pure fluoride glass.

Additionally, as chlorine in increasing concentrations is added to the oxyhalide glass composition, spectral properties essentially identical to those of pure chloride glasses are obtained. In particular, oxyhalide glasses having from 4.5 to 8.5 wt. % chlorine have emission spectral properties from 1450 to 1650 nm which are essentially identical to those of a pure chloride glass. Further, oxyhalide glasses having from up to 12 wt. % chlorine have absorption spectral properties from 1450 to 1650 nm which are essentially identical to those of a pure chloride glass.

Substitutions of germanium and lead for silicon, gallium for aluminum or boron, and antimony for boron can be used to improve fluorescence intensities and emission lifetimes, and also to modify liquids temperatures, viscosity curves, expansivity, and refractive index. The identity of the alkali/alkaline earth can be varied to vary the refractive index and to increase or decrease thermal expansivity. Glasses containing optically active REEs can be co-doped with non-active REEs (for example, Er co-doped with La or Y) to increase emission lifetimes, or co-doped with optically active REEs (such as Er co-doped with Yb) to improve quantum efficiency. By varying bulk composition, glasses can be formed with optical properties transitional between pure fluoride and pure oxide glasses, and between pure fluoride and pure chloride glasses, and between pure chloride and pure oxide glasses, thus affording maximum flexibility in optical properties. In particular, glasses having a broad flat emission spectra are possible.

Thus, the glass matrix of the present invention has absorption and emission characteristics that are effectively hybrids of the best characteristics obtained in chloride, oxide, or fluoride glasses alone. However, unlike fluoride and chloride glasses, which must be fabricated in an inert atmosphere, these glasses can be fabricated in air using standard melting techniques and batch reagents. In addition, the environmental stability of the hybrid glasses considerably exceeds that of pure fluoride or chloride glasses. Moreover, the addition of fluorine allows the glass matrix to obtain much of the bandwidth and gain flatness of a fluoride glass by creating environments for the REE that are a combination of oxide and fluoride-like sites. Furthermore, the addition of chlorine to hybrid glasses of the present invention substantially increases emission lifetimes relative to an oxide or oxyfluoride glass.

The properties of the glass matrix make it desirable for a number of applications. The glass matrix, with a compatible covering or cladding, can be formed into optically active devices, such as optical amplifiers or lasers. Further, the glasses may be used alone in planar amplification applications. In addition, the glass matrix may be used in combination with chlorine-free oxyfluoride clad glasses for double-crucible fiberization or rod-and-tube redraw. Further, it is possible to tailor the emission/absorption spectrum of the disclosed glass matrix to "fill in holes" in the gain spectrum of conventional amplifier materials, such as silica, or ZBLAN, in a hybrid amplifier to provide a still greater degree of gain flatness than can be obtained from any of these materials alone.

Another aspect of the present invention relates to a method of making the glass matrix. The glass matrix may be produced according to standard techniques for making glasses. Preferably, the method includes providing glass forming components and treating the glass forming components under conditions effective to produce the glass matrix Preferably, the treating step is achieved by melting the glass forming components to produce a glass melt, forming the glass melt into a glass shape, and cooling the glass shape. Preferably, the components are melted at a temperature of from about 1300E to about 1500EC for from about 2 to about 4 hours to produce the glass melt. Next, the glass melt is formed into a glass shape. Suitable forming procedures include rolling, pressing, casting, or fiber drawing. The glass shape is then preferably a patty, rod, sheet, or fiber. Subsequently, the glass shape is cooled. The cooled glass shape is then annealed at a temperature of from about 350E to about 450EC for from about 0.5 hours to about 2 hours. The glass shape is then cooled after annealing to about room temperature.

Yet another aspect of the present invention relates to a method of modifying the spectral properties of an oxyhalide glass. The method includes altering the halide content of the oxyhalide glass where the spectral properties of the oxyhalide glass are modified.

As discussed above, by increasing the content of, for example, chlorine and fluorine in the oxyhalide glass, the spectral properties of the oxyhalide glass can be modified to be essentially identical to those of a pure halide glass. When fluorine alone as the halide is added, this results in the spectral properties typical of pure fluoride glasses, including broad emission spectra, improved emission lifetimes, and relative band intensities like fluorides rather than oxides. In particular, emission and absorption spectral properties are essentially identical to those of pure fluoride glasses. Likewise, when chlorine alone is added, this results in an oxyhalide glass having spectral properties essentially identical to pure chloride glasses, in particular the emission and absorption spectra. When mixtures of chlorine and fluorine are added, spectral properties of a hybrid glass are obtained, where the spectral properties of the glass can range from a pure fluoride to a pure chloride to a hybrid. In particular, a glass containing amounts of fluorine and chlorine can be tailored to suit specific applications. It is highly desirable to produce a glass containing fluorine and chlorine such that the glass has a broad flat emission spectrum.

EXAMPLES

Example 1

Glass Preparation Procedures

Various glasses were prepared by mixing together amounts of batch materials as shown in Table I below.

TABLE I

| | Compositions (in mole %) | | | | | | | |
|---|---|---|---|---|---|---|---|---|
| | 1 | 2 | 3 | 4 | 5 | 6 | 7 | 8 |
| $SiO_2$ | 30 | 30 | 30 | 30 | 30 | 55 | 42.1 | 42.1 |
| $Al_2O_3$ | 18 | 19 | 19.8 | 12.5 | 13.5 | 5.25 | 6 | 6 |
| $Al_2F_6$ | 3 | 2 | 1.25 | 8.5 | 7.5 | 6.75 | 5.7 | 5.7 |
| $B_2O_3$ | 28 | 28 | 28 | 28 | 28 | 15 | 15.4 | 15.4 |
| $K_2F_2$ | 9 | 12 | 12 | — | — | — | — | — |
| $K_2Cl_2$ | 10.5 | 7.5 | 6.75 | 3 | 6 | — | — | 2 |
| $K_2O$ | 1.5 | 1.5 | 2.25 | 18 | 15 | 18 | 17.3 | 15.3 |
| $Er_2O_3$ | .03 | .03 | .03 | .03 | .03 | .012 | .011 | .011 |
| $GeO_2$ | — | — | — | — | — | — | 13.5 | 13.5 |

Subsequently, the batch materials were ball milled and charged into covered platinum crucibles. The crucibles were entered into an electrically heated furnace held at from about 1300E to about 1500EC and melted for from about 2 to about 4 hours. Next, the melts were poured onto steel plates in order to form the melts into a glass shape. The melts then were cooled. The cooled melts were placed into annealing ovens and held at from about 350E to 450EC for one hour. After annealing, the furnaces were allowed to cool at furnace rate to room temperature.

Spectroscopic Analysis

The glass samples for spectroscopic analysis were polished pieces approximately 20×20×5–10 mm. Absorption measurements were made using a Nicolet FT-IR spectrophotometer (Madison, Wis.) with a 4 cm$^{-1}$ resolution and collecting 256 FID's per sample. Fluorescence emission spectra of Er was generated by pumping the 520 nm absorption with a Xenon lamp. The 1.5 micron emission was measured using a liquid nitrogen cooled Si detector in conjunction with a SPEX Fluorolog spectrophotometer (Edison, N.J.). Data was collected over the range 1400–1700 nm in 0.5 nm steps, counting for 1.5 seconds/step. For comparative purposes, a linear background was subtracted from each spectrum, with each spectrum then being normalized to a value of 1.0 for the maximum peak intensity. Data for the samples is provided in the examples below.

Example 2

Comparison of Emission Spectra of $Er^{3+}$ in $SiO_2$, ZBLAN, and Sample 9

The emission spectra of $Er^{3+}$ in a silica oxide glass, ZBLAN (a pure fluoride glass), and a glass in accordance with the present invention were determined for comparison. The spectra are shown in FIG. 1.

The present glass is a potassium boroaluminofluorosilicate glass having the composition shown below in Table II as Sample 9.

TABLE II

| Sample 9 | mole % |
|---|---|
| $SiO_2$ | 55.60 |
| $Al_2O_3$ | 7.88 |
| $Al_2F_6$ | 3.82 |
| $K_2O$ | 6.73 |
| $K_2F_2$ | 10.60 |
| $B_2O_3$ | 15.20 |
| $Er_2O_3$ | 0.012 |

The emission spectrum of $Er^{3+}$ in the silica oxide glass was very similar to the spectrum obtained in typical fluorine-free aluminosilicate glasses. The emission spectrum of $Er^{3+}$ in the Sample 9 glass, however, was identical to the spectrum of $Er^{3+}$ in ZBLAN, indicating that $Er^{3+}$ is surrounded by fluorine in the Sample 9 glass, much as in ZBLAN. The flatness of the emission spectrum from 1530 to 1560 nm leads to a comparatively flat gain spectrum for ZBLAN. FIG. 1 shows that the same gain flatness can be obtained from the Sample 9 glass, but, unlike ZBLAN, it can be prepared in a conventional furnace.

Example 3

Comparison of Absorption Spectra of $Nd^{3+}$ on Various Fluoride and Oxide Hosts The optical absorption spectra of $Nd^{3+}$ in various fluoride and oxide hosts were compared. Fluoroberylate and fluorozirconate hosts contain no oxygen, and this causes the relatively intense absorption band at 800 nm to blue shift to lower wavelength, and for it to be more intense or subequal in intensity to the band at 580 nm. In phosphate, borate, and silicate hosts containing no fluorine, the band near 800 nm was red-shifted to higher wavelengths relative to the fluoride hosts, and was less intense than the peak absorbance near 580 nm.

Example 4

Addition of Fluorine to an Alkali Boroaluminosilicate Glass

Figure 2:
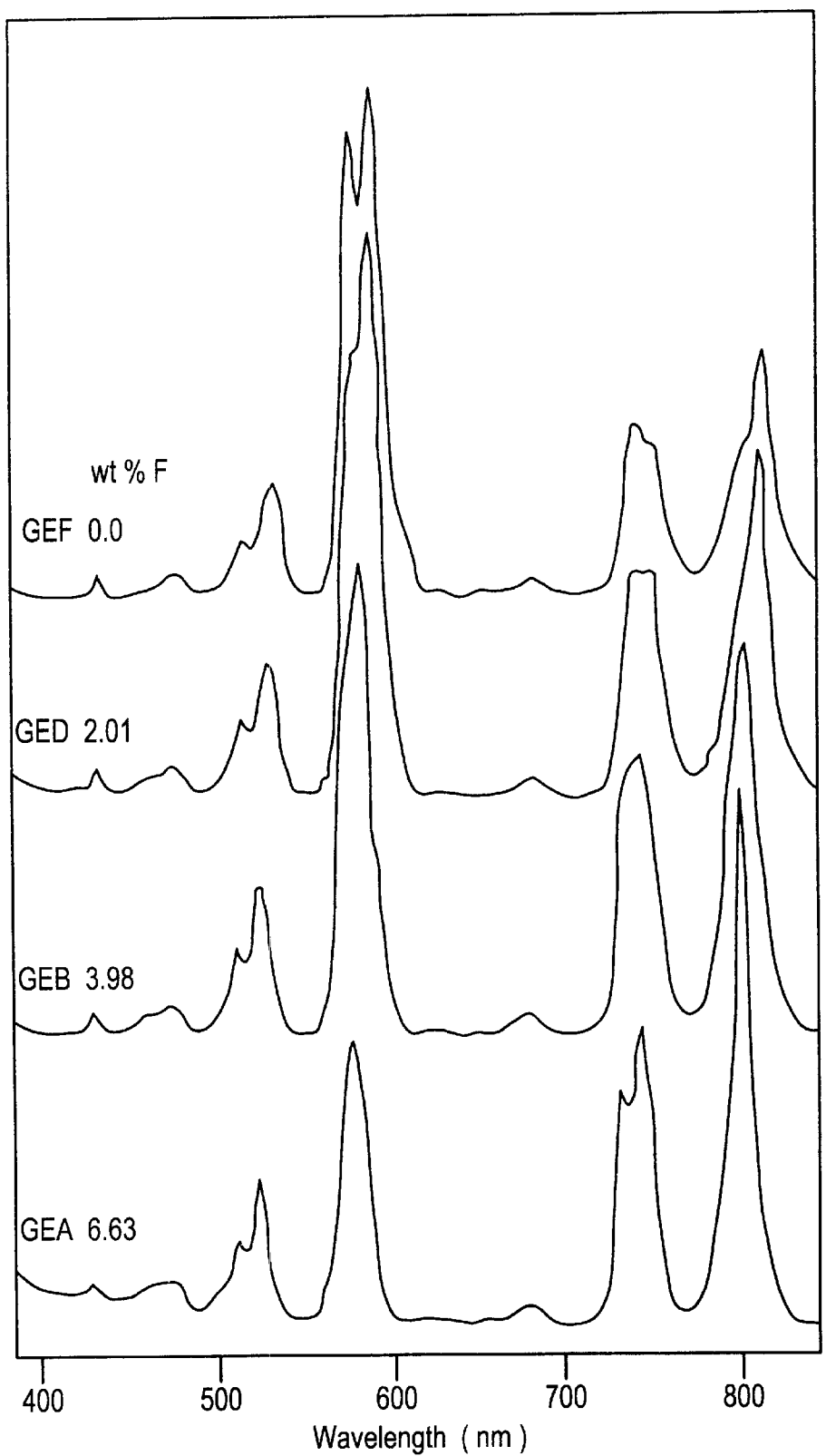
FIG. 2 is a graph showing the effect on the absorption spectrum of $Nd^{3+}$ through the addition of fluorine to an alkali boroaluminosilicate glass.

The effect of adding increased amounts of fluorine to alkali boroaluminosilicate glasses similar to Sample 9 glass (shown in Example 2) on the absorption spectrum of $Nd^{3+}$ was investigated and is shown in FIG. 2. The results show that as fluoride concentration increased, the peak absorbance near 800 nm increased in intensity relative to the 580 nm peak and shifted to lower wavelengths, such that at 6.63 wt. % added fluorine, the absorption spectrum represents that of $Nd^{3+}$ in fluoroberylate hosts. Erbium is considered a heavy REE, whereas neodymium is considered a light REE. Therefore, the results indicate that the fluoride-like environments are produced in the glass matrix of the present invention for both heavy and light rare earth elements.

Example 5

Comparison of $Er^{3+}$ Emission and Absorption Spectra of Alkali Boroaluminosilicate Glasses with Different Concentrations of Fluorine The $Er^{3+}$ emission spectra of alkali boroaluminosilicate glasses with different concentrations of fluorine were compared with silica. As the level of fluorine increased, the relative intensity at 1530 nm decreased at the expense of emission in the region from 1540–1560 nm, until at 9.6 wt. % batched fluorine the emission spectrum was basically a smooth line from 1530 to 1560 nm. This creates many possibilities for producing flat gain amplifiers or hybrid amplifiers involving combinations of two or more glasses.

As fluorine concentration increased, so too did the absorption feature near 1.5 μm. In the glass with 9.6 wt. % batched fluorine, the absorption spectrum was essentially identical to that of $Er^{3+}$ in ZBLAN, a fluorozirconate glass having potential for fiber amplifier applications. The extent to which the emission and absorption spectra of $Er^{3+}$ can be manipulated in these oxyfluoride glasses greatly exceeds the possibilities in oxide or fluoride glasses alone. It opens up significant opportunities for 1.5 μm amplifiers and hybrid amplifiers.

Table III below shows the $Er^{3+}$ emission lifetimes in alkaline earth aluminosilicate and alkali aluminosilicate glasses as a function of fluorine concentration.

TABLE III

| wt. % F | lifetime (ms) |
|---|---|
| 0.0 | 6.9 |
| 3.5 | 7.0 |
| 6.0 | 7.0 |
| 7.0 | 8.1 |
| 10.0 | 8.7 |
| 13.4 | 8.9 |

The addition of increased amounts of fluorine to aluminosilicate glasses substantially increased lifetimes (Table III), had a modest effect on the shape of the emission spectrum, and greatly increased the amount of REE that could be added before nonradiative losses reduced lifetimes. This effect was also observed in alkali boroaluminofluorosilicate glasses, although with much larger changes to the shape of the emission spectrum.

Representative composition limits for oxyfluoride glasses of the present invention are shown in Table IV.

TABLE IV

| Oxide | Mole % |
|---|---|
| $SiO_2$ | 0–70 |
| $Al_2O_3$ | 0–30 |
| $B_2O_3$ | 0–30 |
| $R_2O$ | 0–35 |
| $Er_2O_3$ | $\leq 0.5$ |
| $(Y,La,Gd)_2O_3$ | $\leq 10x\ Er_2O_3$ |
| F | 2–20 (wt. %) |

Example 6

Comparison of the 1530 $Er^{3+}$ Absorption Spectrum of an Oxyfluoride Glass with a Glass of the Same Overall Composition but Containing 0.9 wt. % Cl The 1530 $Er^{3+}$ absorption spectrum of an oxyfluoride glass (sample 7 as prepared in Example 1 containing 8.5 wt. % F) was compared with a glass of the same oberal composition but additionally containing 0.9 wt. % Cl (sample 8 as prepared in Example 1). Addition of Cl to the glass shifted the absorption spectrum to a longer wavelength (~7 nm), showing that Cl is intimately associated with the REE in the glass, even at this relatively low concentration. There was a corresponding shift in the position of the primary emission line (from 1530 nm to approximately 1537 nm). Much higher chlorine retentions and overall chloride levels were obtained in glasses with $M_2O/Al_2O_3$ ratios of 1.0 or less, with comparable effects on the absorption and emission spectra.

Example 7

Comparison of the 1530 nm $Er^{3+}$ Absorption Spectrum in ZBLAN Near 1520 nm with Spectra Obtained from Glasses in this System Containing Varying Amounts of Fluorine and Chlorine The 1530 nm $Er^{3+}$ absorption spectrum in ZBLAN near 1520 nm was compared with spectra obtained from the specified glasses produced in Example 1 and having the halide composition shown in Table V below.

TABLE V

| glass | wt. % Cl | wt. % F |
|---|---|---|
| 4 | 2.4 | 10.6 |
| 5 | 4.7 | 9.2 |
| 3 | 5.4 | 6.7 |
| 2 | 5.9 | 7.5 |
| 1 | 8.0 | 7.3 |

The absorption spectrum of sample 4 was qualitatively similar to that of ZBLAN, though its emission spectrum was very much broader. Replacing increasing amounts of fluorine with chlorine caused a large red-shift of the main absorption line to nearly 1540 nm while preserving the position of the blue-edge of the band near 1495 nm. At the highest chlorine concentration in this series (sample 1), the spectrum resembled that of a pure chloride glass. Because the main absorption band shifted to steadily longer wavelength without bifurcating, the environments represented by the intermediate compositions are not simply sums of the endmembers (samples 4 and 1), but hybrid sites or sums of many hybrid sites with variable anion contents.

Example 8

Comparison of the Emission Spectra of ZBLAN and Samples 6 and 4

The emission spectra of ZBLAN and sample 6 (as prepared in Example 1) were compared with that of sample 4 (as prepared in Example 1). The emission spectrum of sample 4 was far broader than those of other glasses, extending from 1525 nm to more than 1570 nm. The lifetime of the erbium emission was also increased as chlorine was added to the glass. These results indicate that the shape of the emission spectrum can be adjusted considerably by varying the relative proportions of fluorine and chlorine and by varying the proportions of both of these with respect to oxygen. To the extent that chlorine alone is inserted into the rare earth environment, these glasses are also potentially attractive as hosts for Dy, Nd, and Pr in 1.3:m amplifier applications.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. An oxyhalide host glass for a rare earth element, the glass having a composition consisting essentially of 0–70 mol. % $SiO_2$, 5–35 mol. % $Al_2O_3$, 1–50 mol. % $B_2O_3$, 5–35 mol. % $R_2O$ where R is Li, Na, K, Rb or Cs, and an amount up to 0.2 mol. % rare earth element, and in wt. %, an amount up to 12% of F, Cl or mixtures.

2. An oxyhalide glass matrix comprising 0–70 mol. % $SiO_2$, 5–35 mol. % $Al_2O_3$, 1–50 mol. % $B_2O_3$, 5–35 mol. % $R_2O$, an amount up to 12 wt.% F, 0–12 wt. % Cl, and 0 and 0.2 mol. % rare earth element, wherein R is Li, Na, K, Rb or Cs wherein the fluorine is present in $Al_2F_6$.

3. An oxyhalide glass matrix comprising 0–70 mol. % $SiO_2$, 5–35 mol. % $Al_2O_3$, 1–50 mol. % $B_2O_3$, 5–35 mol. % $R_2O$, 0–12 wt. % F, an amount up to 12 wt. % Cl, and 0 and 0.2 mol. % rare earth element, wherein R is Li, Na, K, Rb or Cs wherein the chlorine is present in $Al_2Cl_6$.

4. The glass matrix according to claim 1, wherein the rare earth element is selected from the group consisting of Y, La, Ce, Pr, Nd, Pm, Sm, Eu, Gd, Tb, Dy, Ho, Er, Tm, Yb, and Lu.

5. The glass matrix according to claim 4, wherein the glass matrix includes at least two rare earth elements.

6. The glass matrix according to claim 1, wherein Cl and F are present at a first location within the glass matrix and the oxides are present at a second location within the glass matrix, wherein the first location is distinct from the second location.

7. The glass matrix according to claim 6, wherein the rare earth element is partitioned into the first location.

8. The glass matrix according to claim 6, wherein the rare earth element is partitioned into the first and second locations.

9. The glass matrix according to claim 6, wherein the rare earth element is partitioned into the second location.

* * * * *